April 17, 1934.   L. J. MARINGER   1,954,883
COMBINED HEATER AND COOLER FOR LIQUIDS
Filed May 7, 1932
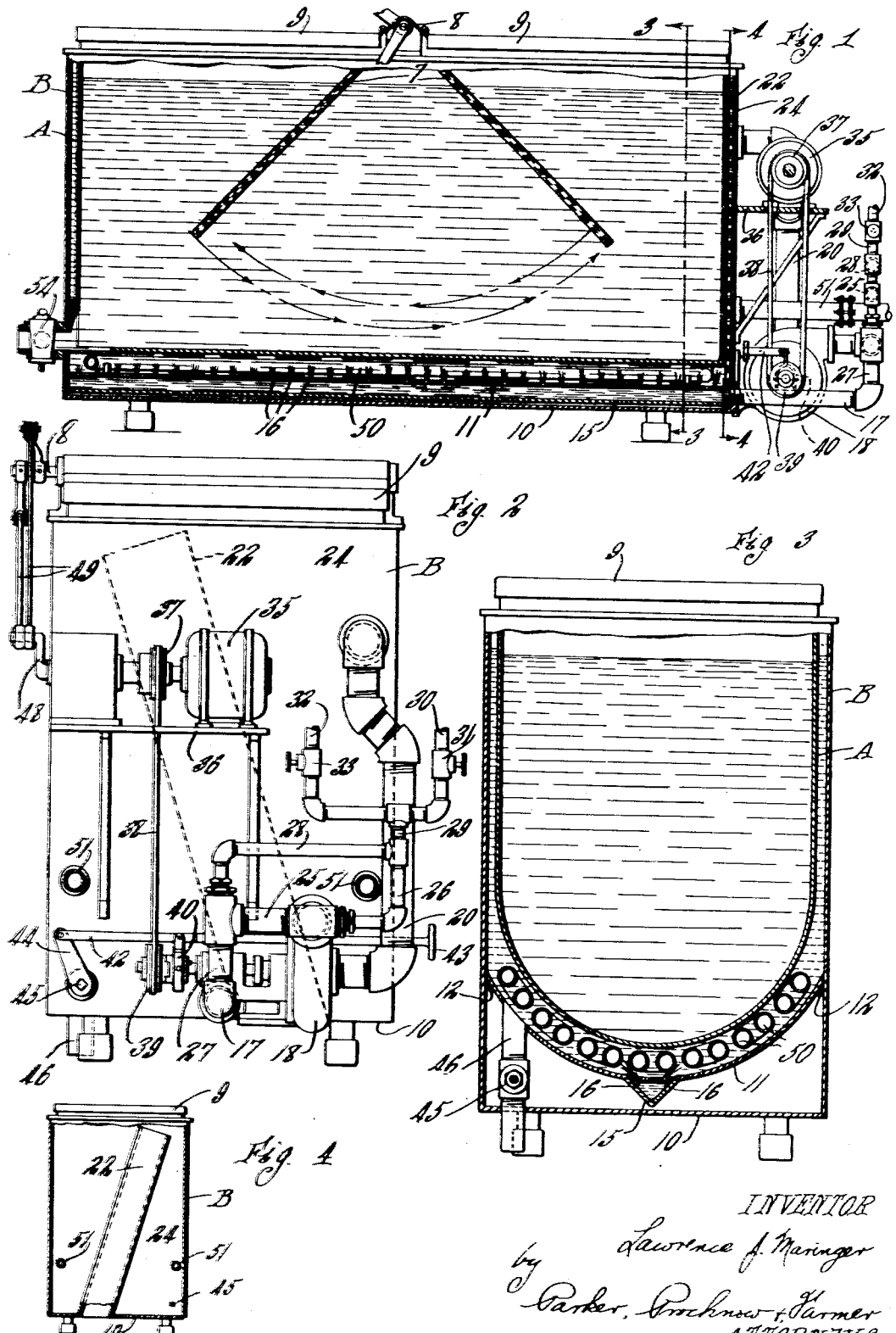

Patented Apr. 17, 1934

1,954,883

UNITED STATES PATENT OFFICE 1,954,883

COMBINED HEATER AND COOLER FOR LIQUIDS

Lawrence J. Maringer, Buffalo, N. Y., assignor to R. G. Wright & Company, Buffalo, N. Y.

Application May 7, 1932, Serial No. 609,970

11 Claims. (Cl. 257—76)

This invention relates to apparatus by means of which a liquid, while in a vat or container, may be heated and cooled as desired. More particularly the invention relates to apparatus for pasteurizing liquids and for subsequently cooling the liquid while in the said apparatus.

Apparatus has heretofore been provided in accordance with which both the heating and cooling can be accomplished in the same apparatus, and in which the cooling medium was cooled by some means exterior of the apparatus itself. One of the objects of this invention is to provide an apparatus of this kind in which the means for cooling the circulating fluid is built into and contained in the heating and cooling apparatus itself.

Other objects of the invention are to provide an apparatus of this kind by means of which a body of cooling fluid occupies most of the space surrounding a vat containing the liquid to be treated, and in which this space is so formed as to accommodate a small quantity of cooling fluid, so that the temperature of this fluid can be quickly lowered, resulting in a rapid cooling of the liquid which is being treated; also to provide an apparatus of this kind in which a coil for a cooling medium is arranged in the space in which the cooling fluid circulates; also to provide an apparatus of this kind in which the cooling fluid passes from the lower portion of the space past the coil for the cooling medium, and is withdrawn near the top of the space; also to provide circulating means for the fluid which may either be used for heating the fluid which is being circulated, or for cooling such fluid; also to provide means of improved construction for heating the fluid; also to provide an apparatus of this kind which is so constructed that it may be used for rapidly chilling the liquid or for maintaining the liquid cold during storage without freezing the same; also to improve the construction of apparatus of this kind in other respects hereinafter specified.

In the accompanying drawing:

Fig. 1 is a central longitudinal sectional elevation of a heating and cooling apparatus embodying this invention;

Fig. 2 is an end elevation thereof;

Fig. 3 is a transverse sectional elevation on line 3—3, Fig. 1;

Fig. 4 is a transverse sectional elevation thereof, on a reduced scale, on line 4—4, Fig. 1.

A represents a vat or container for milk or other liquid to be treated. This container may be of any suitable or desired shape, being shown in the construction illustrated with upright sides and a round bottom. The liquid to be treated is placed into this vat and remains in the same during treatment, suitable means for agitation of the liquid, such as paddles, being used within the vat in the usual manner, such agitating means being indicated in the accompanying drawing in the form of paddles 7 movable about the axis of shaft 8. The vat is open at the top and may be closed by means of a lid 9 of any suitable form which can be opened to afford access to the interior of the vat for cleaning or other purposes.

The vat extends into a tank B, which is sufficiently larger than the vat A to leave a space between the sides and bottom of the vat and the tank in which fluid for heating or cooling the liquid in the vat A may be circulated. This space is preferably relatively small so that only a comparatively small quantity of fluid need be handled. In the construction shown, the tank B has straight side walls extending downwardly to a false bottom 10, the real bottom of the tank being shown at 11, and being rounded so as to conform approximately to the contour of the bottom of the vat A and the bottom 11 is suitably secured to the side walls of the tank above the false bottom 10, for example, by means of welding, as indicated at 12, or in any other suitable manner.

The fluid for heating and cooling is preferably introduced into the lower portion of the tank and withdrawn from the upper portion thereof. Any suitable or desired means for providing for such circulation of the fluid may be provided. In the particular construction shown, the trough or conduit 15 is provided at the bottom of the tank, that shown being in the form of an angle bar which may be welded or otherwise suitably secured at its edges to the bottom wall 11 of the tank, and suitable apertures 16 are provided at intervals in the bottom of the tank through which liquid from the conduit 15 is directed toward opposite sides of the space between the tank and vat. This conduit 15 is connected at one end to a pipe 17 connected with the discharge of a pump 18 or other suitable means for producing a circulation of the fluid. The conduit 15 also acts to reinforce and stiffen the bottom 11 of the tank. The space between the bottom 11 and false bottom 10 may contain heat insulating material (not shown), and heat insulating material may also be provided on the outer surfaces of the side walls of the tank B.

The inlet of the pump is preferably connected by means of a conduit 20 to receive liquid from the upper portion of the tank, this conduit preferably receiving fluid slightly below the normal level of the fluid in the space between the tank and vat. This level of the fluid is determined by means of an overflow duct of any suitable kind, the apparatus shown being provided with a duct 22 of channel-shaped form, the free edges of which are welded or otherwise secured to the end wall 24 of the tank. The duct in the construction shown is arranged at an inclination, as clearly indicated in Fig. 4, and is open at its upper end to receive fluid near the top of the tank and is open at its lower end to discharge such fluid out of the tank. By arranging the duct at an inclination, the duct also acts as a vent for the upper portion of the space to prevent gas or vapor from accumulating therein and building up a pressure. This overflow duct, being secured to the end wall 24, also serves to reinforce this end wall which carries the pump 18 and ducts connecting therewith and other parts of the apparatus, as will be hereinafter described.

During the use of the apparatus for heating a liquid in the vat A, the fluid is circulated by means of the pump, and a heating medium of any suitable kind is introduced into the pipe 17. For this purpose, this pipe is provided with a portion 25 in which a suitable jet of heating medium, such for example as steam, is provided, the steam being supplied to the jet by means of a branch steam pipe 26. Another straight portion 27 of the pipe 17 is provided with an inlet for steam or other heating medium from a branch pipe 28, both branch pipes being connected to a common pipe 29 which in turn is connected with a pipe 30 for steam or other heating medium, this pipe being controlled by a valve 31. The pipe 29 may also be connected with a source of fluid, such for example as water, by means of a pipe 32 controlled by a valve 33. When it is necessary to place fluid into the space between the tank and the vat, the valve 33 is opened permitting water or other fluid to pass from the pipe 32 through the pipe 29 and branch pipes 26 and 28 into the inlet pipe 17, from which it is distributed to the bottom of the tank until the fluid in the tank reaches the desired level or overflows through the duct 22. When it is desired to heat this fluid, the valve 33 being closed, the valve 31 is opened and the pump 18 is operated. Fluid will, therefore, be withdrawn from the upper portion of the tank through the pipe or conduit 20 and forced by the pump 18 through the conduits 17 and 16 and into the bottom of the space between the tank and vat. The fluid will pass along the outer surface of the wall of the vat A and will move upwardly in contact with this wall until it is again withdrawn from the tank through the duct 20. The heating medium entering into the pipe 17 as described also serves to increase the speed of circulation of the heating fluid.

The pump 18 may be driven in any suitable or desired manner. In the construction shown a motor 35 is mounted on a bracket 36 secured to the end wall 24 of the tank and on the shaft of the motor is a pulley 37 cooperating with a belt 38, and another pulley 39 is free to rotate about the axis of the pump shaft. A clutch having a movable member 40 is mounted on the pump shaft to engage with the pulley 39 to drive the pump shaft when the clutch is in the position shown in Fig. 2. The clutch member 40 is preferably connected to an actuating rod 42 having a handle 43 at one end thereof, and the end of the actuating rod 42 preferably also connects with a handle 44 of a valve 45 through which the fluid in the tank may be discharged from the tank through a drain pipe 46. Consequently, by moving the rod 42 to the right in Fig. 2, the clutch member 40 is shifted into a disengaging position and the valve 45 may be opened. The drain pipe 46 preferably connects with the tank B at a distance above the bottom thereof so that after the liquid in the tank A has reached the desired temperature, such for example as the pasteurizing temperature, it may be prevented from becoming excessively heated by draining most of the heating fluid from the tank B. The liquid in the vat may then be maintained at this temperature for a period of time by means of the heated liquid remaining in the bottom of the tank B below the level of the drain pipe.

The motor 35 is preferably also used for actuating the paddles 7, the end of the motor shaft being for this purpose provided with a crank 48 having connecting rods 49 journalled thereon, which in turn connect with cranks on the shaft or axes of the paddles 7. The connections between these crank arms and the paddles may be similar to those shown in the Wright United States Patent No. 1,823,637 of September 15, 1931. Consequently, by means of the clutch member 40, the operation of the circulating means may be interrupted without interrupting the operation of the paddles. Preferably, the operating rod 42 is so connected with the clutch member 40 that a slight movement of the actuating rod 42 will cause the clutch member 40 to be moved into disengaging position without opening the valve 45 and further movement of the rod 42 will cause the valve member 45 to be opened.

In order to rapidly cool the liquid within the tank A, a suitable refrigerant or cooling medium is preferably employed to cool the fluid which is circulated in the space between the tank and the vat, and in the construction shown for this purpose, a coil of pipe 50 is provided in the bottom of the space between the tank and the vat. The coil 50 is connected by means of pipes 51 with any suitable source of cooling medium. For example, ammonia from a refrigerating machine may be passed through the coil 50 and evaporated therein, or, if desired, brine which has been cooled by a refrigerating machine may be circulated through the coil 50. The arrangement of the coil within the relatively small space between the vat and the tank, as clearly shown in Fig. 3, results in the passage of the cooling fluid from the duct or conduit 16 into contact with all of the pipes constituting the coil 50, so that the fluid is thoroughly chilled and passes upwardly through a portion of the space between the tank and vat and is finally discharged through the pipe 20 leading to the pump 18. This fluid which becomes heated by contact with the walls of the vat A is against cooled by contact with the coil 50 after being introduced into the bottom of the tank B. By making the space between the tank and the vat as small as possible, a comparatively small amount of fluid is circulated, and consequently, less time is required to cool this small amount of fluid, so that the time required for cooling the liquid in the vat A is materially reduced. When the treatment of the liquid in the vat A has been completed, it may be withdrawn through a valve 54 of any usual or suitable construction, and another batch of liquid may then be passed into the vat A. The flow of refrigerating medium through the coil 50 is, of course, interrupted as soon as the liquid has been chilled to the desired extent, and any cooling medium remaining in the coil 50 will be evaporated or heated when heating fluid is introduced for the treatment of a fresh batch of liquid in the vat A, so that the coil 50 is inoperative during heating of the liquid in the vat, and does not interfere with the circulation of the heating fluid.

In the operation of the apparatus, after the liquid in the vat A has been heated to the desired extent, and it is desired to cool the same, the heating fluid in the tank B is preferably withdrawn through the drain pipe 46 and cold water from the pipe 32 may then be circulated in the space between the vat and the tank to effect a preliminary cooling of the liquid in the vat. After the temperature of this liquid has been reduced to some extent by the circulation of this water, which may be permitted to overflow through the duct 22, the refrigerating medium may be passed through the coil 50 and the supply of further fluid through the pipe 32 may then be interrupted and the pump used to produce circulation. The circulation of the fluid in contact first with the coil 50 and then with the walls of the vat A results in a rapid chilling of the liquid in the vat, and after this liquid has been lowered to the desired temperature, the liquid may be discharged through the valve 54 and fresh liquid introduced into the vat, whereupon the process may be repeated.

It is desired at times to use the apparatus for storing liquid over night or for a period of time and for maintaining the liquid in chilled condition during the storage. In order to do this, the liquid is first brought to the reduced temperature by circulating fluid in the space between the vat and the tank, and after the liquid in the vat has been cooled to the desired temperature, the rod 42 may be actuated to disengage the clutch member 40 from the pulley 39 without, however, opening the valve 45. The circulation of cooling medium through the coil 50 may then be continued and also the operation of the paddles, which will result in a cooling only of the portion of the fluid in the lower portion of the space between the vat and the tank. By means of the paddles 7, the liquid chilled in the lower portion of the vat is circulated and mixed with liquid in other portions of the vat, so that liquid can be maintained at a low temperature for a considerable period of time without danger of freezing.

The apparatus described has the advantage that it provides in a single self-contained apparatus the combined functions of heating the liquid and cooling the same, and in addition thereto, the apparatus may be used for storing liquid at a reduced temperature. By cooling the circulating fluid within the circulating space between the tank and the vat, the need for additional apparatus for this purpose is eliminated, so that in the floor space required for combined heating and cooling of liquid is materially reduced as well as the cost of apparatus for this purpose. The apparatus described is also very efficient in operation since the coils for the cooling medium are immersed in the fluid and located in immediate vicinity of the liquid to be cooled, so that practically no cooling effect is lost in transmission of cooled fluid to contact with the tank A.

A further advantage of the construction shown is that by means of this construction, a refrigerant such as ammonia, brine, or the like, can be passed under pressure through the coil and, consequently, a rapid cooling action can be obtained, since the refrigerant may thus be passed through the coil at a high rate of speed. If the refrigerant were blown into the space between the tank and the vat, such pressure necessary to produce rapid flow would buckle the walls of the tank or vat.

Furthermore, if brine or other cooling medium were circulated through the tank in direct contact with the vat, some of the brine or refrigerant would remain in this tank or adhere to the walls after the refrigerant is drained. Then upon later passing the heating fluid into the same space, such refrigerant, when subjected to heat, would have a very corrosive action upon the tank or vat. By employing a coil of pipe or closed passage for refrigerant, the heating fluid cannot mix with the refrigerant and such corrosive action is avoided.

I claim as my invention:

1. A combined heater and cooler for liquids, including a vat for the liquid to be treated, a tank into which said vat extends and which forms about the sides and bottom of said vat a space for the circulation of a fluid for changing the temperature of the liquid by contact with the vat walls, a conduit connected with the upper portion of said tank, a pump having its intake connected with said conduit to draw said fluid from the top of said tank, a second conduit leading from the discharge of said pump to the lower portion of said tank, for returning the fluid to the bottom of said tank and circulating it upwardly through said space and means for injecting heating medium into said second conduit to effect the heating of said fluid and its action thereon, while heated, upon the liquid in said vat, during the upward movement of said fluid through said space.

2. A combined heating and cooling apparatus, including a vat for a liquid to be treated, a tank into which said vat extends and which forms with said vat a space for the circulation of fluid, a coil through which a cooling medium may be passed and located in the lower portion thereof, and means for circulating fluid in said space from the bottom to the top thereof in contact with said coil and said vat, means whereby the fluid in said space is retained therein and acts upon the liquid in said vat when said circulating means is rendered inactive, and means operable at will for imparting heat to said fluid before the same enters said space.

3. An apparatus, including a vat for a liquid to be treated, a tank into which said vat extends and which forms with said vat a space for the circulation of a fluid, and a trough-shaped conduit extending along and having its edges secured to the bottom of said tank for reinforcing the same and for conducting fluid, the bottom of said tank having apertures communicating with said conduit for admitting fluid from said conduit to said space.

4. An apparatus, including a vat for a liquid to be treated, a tank into which said vat extends and which forms with said vat a space for the circulation of a fluid, and a trough-shaped overflow duct secured to a wall of said tank and of materially less width than the width of said wall for reinforcing the same, and open at its upper end to receive liquid from the upper portion of the tank and extending through the bottom of said tank.

5. An apparatus, including a vat for a liquid to be treated, a tank into which said vat extends and which forms with said vat a space for the circulation of a fluid, and a trough-shaped overflow duct secured to a wall of said tank for reinforcing the same and open at its upper end to receive liquid from the upper portion of the tank and extending through the bottom of said tank, said trough being arranged at an inclination to cause liquid overflowing from said tank to flow along one side of said trough and permitting vapor to escape through the other side of said trough, said other side of said trough extending to a higher elevation in said tank than the side of said trough through which liquid flows.

6. A combined heater and cooler for liquids, including a vat for a liquid to be treated, a tank into which said vat extends and which forms about the sides and bottom of said vat a space for the circulation of a fluid for changing the temperature of said liquid, circulating means including a pump for producing circulation of liquid in said tank, a clutch through which said pump is driven, a drain valve for draining liquid from said tank, and a connection between said clutch and valve for interrupting the driving connection with said pump when said valve is opened.

7. A combined heater and cooler for liquids, including a vat for the liquid to be treated, a tank into which said vat extends and which forms with said vat a space for the circulation of a fluid, means in said vat for agitating the liquid in said vat, a motor mounted on said tank for actuating said agitating means, means driven from said motor for circulating liquid in said space, and means operable at will for interrupting the driving connection between said motor and said circulating means.

8. A combined heater and cooler for liquids, including a vat for the liquid to be treated, a tank into which said vat extends and which forms about the sides and bottom of said vat a space for the circulation of fluid, a conduit including a pump and forming with said space a circuit for the circulation of said fluid, said conduit being arranged to receive fluid from the upper portion of said space and to discharge fluid into the lower portion of said space, steam injectors arranged in said conduit for heating the liquid passing through the same, and a coil of pipe arranged in the lower portion of said space in the path of movement of fluid entering said space, said coil being connected with a suitable source of refrigerating medium to effect rapid cooling of fluid in said circuit.

9. An apparatus, including a vat for a liquid to be treated, a tank into which said vat extends and which forms with said vat a space for the circulation of a conditioning fluid, a coil arranged in said space adjacent the bottom of said tank and through which a medium may be circulated to modify the temperature of said conditioning fluid, a fluid conducting passage extending along and secured to the bottom wall of said tank, said wall having a plurality of orifices therethrough extending towards said coil and connecting said passage with said tank, and means for forcing fluid into said passage and through said orifices, whereby said fluid is directed over and into intimate contact with said coil to thereby rapidly condition the fluid in the space about said vat for treatment of the liquid in said vat.

10. A combined heater and cooler for liquids, including a vat for the liquid to be treated, a tank into which said vat extends and which forms about said vat a space for the circulation of a fluid, means in said vat for agitating the liquid in said vat, a motor mounted on said tank for actuating said agitating means, a pump for introducing and circulating said fluid in said space, drive means connecting said motor and said pump for driving the latter, and means for rendering said pump drive means ineffective so that said agitating means may be actuated independently of said pump for effecting movement of the liquid in the vat without circulating the fluid in the space thereabout.

11. A combined heater and cooler for liquids, including a vat for the liquid to be treated, a tank into which said vat extends and which forms about said vat a space for the circulation of a fluid, means in said vat for agitating the liquid in said vat, a motor mounted on said tank for actuating said agitating means, a pump for introducing and circulating said liquid in said space, drive means connecting said motor and said pump for driving the latter, means for rendering said pump drive means ineffective so that said agitating means may be actuated independently for effecting movement of the liquid in the vat without circulating the fluid in the space thereabout, and a coil disposed in a restricted portion of the space between said tank and vat through which a medium may be circulated to modify the temperature of the fluid in said space in the region of said coil, and whereby the temperature of the liquid in the vat is controlled by the exchange of heat between the fluid in the region of said coil and the liquid in the adjacent portion of said vat through the admixture of this liquid with the other liquid in said vat under the action of said agitating means.

LAWRENCE J. MARINGER.